Figure 1:
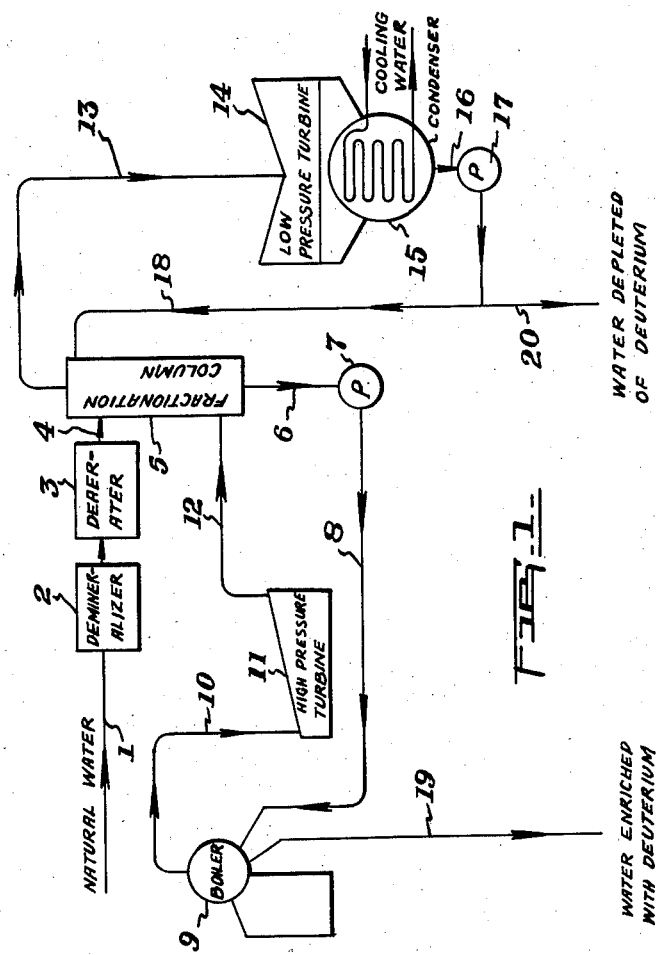

July 9, 1957  J. S. FOSTER ET AL  2,798,359
STEAM POWER PLANT WITH MEANS FOR HEAVY WATER CONCENTRATION
Filed Aug. 1, 1955  2 Sheets-Sheet 1

INVENTORS
JOHN S. FOSTER
GEORGE E. HADDELAND
By-Smart + Biggar
ATTORNEYS

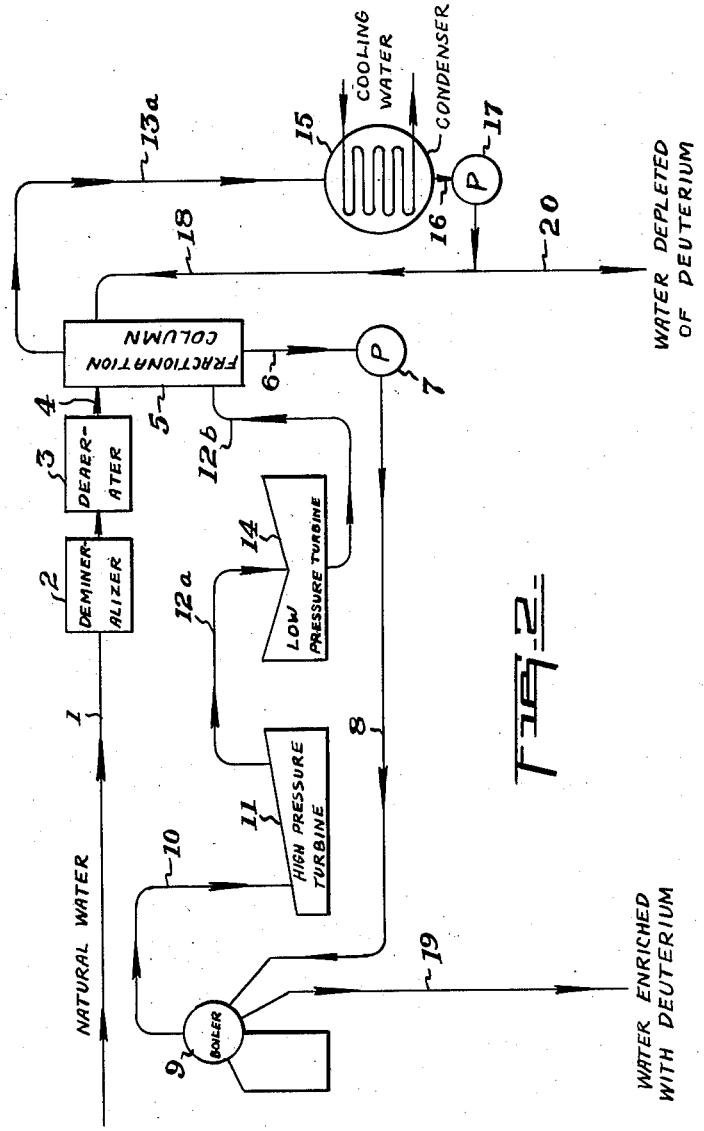

United States Patent Office 2,798,359
Patented July 9, 1957

2,798,359

STEAM POWER PLANT WITH MEANS FOR HEAVY WATER CONCENTRATION

John S. Foster and George E. Haddeland, Deep River, Ontario, Canada, assignors, by mesne assignments, to the United States of America as represented by the United States Atomic Energy Commission Application August 1, 1955, Serial No. 525,732

5 Claims. (Cl. 60—1)

The invention relates to a method and apparatus for obtaining water enriched with deuterium in a form of heavy water (deuterium oxide or hydrogen deuterium oxide).

It is known that water enriched with deuterium can be obtained by fractional distillation of natural water. Current fractional distillation practice is to vaporize the material to be fractionated by means of heat supplied from steam or by combustion of coal, oil or gas, and after the vapors have passed through a fractionation column to condense them in a water cooled or refrigerated condenser. (The term "fractionation column" is used here and throughout this specification to mean any fractional distillation apparatus.) In these methods the heat input to the vaporizer or boiler is lost or wasted in the cooling medium, and this lost or wasted heat is generally much larger than the heat and energy losses through the fractionation column. The concentration of heavy water by these means requires that large quantities of natural water be vaporized to recover a small amount of heavy water (the ratio of deuterium to hydrogen in ordinary water being approximately 1:7000) so that the value of the latent heat per pound of deuterium oxide or heavy water recovered is very large. It has been proposed in some processes for the large scale purification of sea water to recover and utilize some of the latent heat by means of a vapor compression cycle. The vapor is compressed so that condensation will take place at a higher temperature. It can then be used as a heat source in the boiler and the latent heat released produces additional vapor. However, when this method is applied to the large fractionation columns necessary for deuterium concentration, extensive equipment is required as well as a large input of energy to the compressors.

The present invention provides a process and apparatus for the concentration of deuterium by fractional distillation of ordinary water in conjunction with the production of power in a conventional condensing steam power cycle. The total loss or waste of latent heat for the combined deuterium concentration and power production process is approximately half that for both of these processes when they are separate.

According to the invention water enriched in deuterium is obtained by passing the main steam flow and returning condensate stream of a condensing steam power cycle in opposite directions through a fractionation column located at a suitable place in the cycle. Steam and condensate contained in the high pressure end of the fractionation column, in the boiler, and in all piping and equipment which connect these or which are joined to them or such connection are enriched in deuterium; and steam or water or both so enriched may be withdrawn from this part of the system. Steam and condensate contained in the low pressure end of the fractionation column, in the condenser, and in all piping and equipment which connect these or which are joined to them or such connection are depleted in deuterium; and steam or water or both so depleted may be withdrawn from this part of the system.

Preferably the process is carried out at relatively low pressures and the fractional distillation apparatus would normally be located where it would receive exhaust steam from a simple turbine or from an element of a compound turbine and would discharge the steam directly to the condenser or to a subsequent turbine element. Water enriched in deuterium would normally be drained from the boiler since this conforms with usual boiler operation and water depleted in deuterium would be discharged most conveniently from some point after the outlet of the pump which removes the condensate from the condenser and before the condensate inlet to the fractionation column.

The energy requirement of the combined deuterium concentration and power production process is greater than that for a similar independent power production process alone by the amount of heat lost from the fractional distillation apparatus and by an increase in the amount of heat rejected to the condenser cooling water. Because of the decrease in pressure and temperature of the steam in its passage through the fractionation column some of the heat in the steam is rendered unavailable for producing useful work in the turbine. This heat is rejected to the condenser coolant. To maintain turbine output the steam flow must be increased and the additional latent heat associated with this increase is also rejected to the condenser coolant.

A first advantage of the invention is that the combined deuterium concentration and power production process employs essentially the same boiler and condenser equipment required by a similar independent power production process alone. A second advantage is that the combined process requires relatively little more energy than a similar independent power production process alone. As a consequence of these two advantages equipment and energy costs for the combined process are considerably less than for the two separate processes operated independently. A third advantage is that the fractional distillation apparatus offers an opportunity for effecting some water separation either with or without additional equipment, so that if it is installed after a turbine stage where the steam is normally wet it may be possible to provide drier steam to the succeeding stage.

The invention will be further described with reference to the accompanying drawings in which:

Figure 1 shows in diagrammatic form a method and apparatus according to the invention, and Figure 2 shows a variation of the method and apparatus shown in Figure 1.

Referring to Figure 1, natural water (i. e. water containing a naturally occurring concentration of deuterium) is fed by gravity or pressure through a pipe 1 to any suitable distilling or demineralizing equipment 2 and deaerating equipment 3 or other suitable water treatment equipment whose purpose is to remove dissolved minerals and gases from the water feed. The water then flows, under pressure or gravity, through a pipe 4 to the low pressure end of a fractionation column 5. This column may contain a multitude of horizontal perforated trays or bubble cap plates or it may be filled with metal or ceramic rings, balls, discs or other shapes or with perforated metal pieces or screens or corrugated vertical or horizontal screens or slotted metal sheets. The water passes downward, by gravity, through the packed column 5 to a pipe 6 at the high pressure end of the column and is then pumped through a pump 7 and a pipe 8 to a boiler or steam generator 9. Here the bulk of the water is vaporized to steam at pressures up to several thousand pounds per square inch, and this steam flows through a pipe 10 to a high pressure turbine 11. Steam discharged from the turbine 11 passes through a pipe 12 and upward through the column 5. From the top of the column 5 the steam passes through a pipe 13 to a low pressure turbine 14. From the turbine 14, the steam enters a water cooled condenser 15 and is condensed to water which is drawn through a pipe 16 to a pump 17 and pumped to the top of the fractionation column 5 through a pipe 18. This water than flows downward through the fractionation column 5, counter to the steam flow, mixing with the natural water feed makeup and returns to the boiler 9 by means of the pump 7. Water containing a higher concentration of deuterium than the natural water feed is drawn off from the boiler 9 through a pipe 19 and water containing a lower concentration of deuterium than the natural water feed is drawn off through a pipe 20.

Alternatively, the column 5 might be installed between the low pressure turbine 14 and the condenser 15 as shown in Figure 2 in which the same reference designations are used as in Figure 1 for the same parts. Condensate from the condenser 15 and natural water feed make-up pass to the column 5 as before and draw-off from the column 5 is pumped back to the boiler 9 as before. However, steam passes directly from the high pressure turbine 11 to the low pressure turbine 14 by a pipe connection 12a, and from the low pressure turbine 14 to the fractionation column 5 by a pipe connection 12b. Steam from the fractionation column 5 is taken to the condenser 15 by a pipe connection 13a.

It is intended that what are referred to herein as the high pressure and low pressure turbines may be stages or groups of stages of a simple turbine or they may consist of one or more elements of a compound turbine and these turbines together may drive one or more electrical generators or other equipment.

The fractionation column 5 serves to concentrate deuterium. Since water containing deuterium is less volatile than water containing no deuterium, the deuterium tends to concentrate in the liquid phase. Thus, the water passing downward through the column 5 becomes enriched in deuterium and the steam passing upward becomes depleted in deuterium. The function of the packing in the column 5 is to facilitate exchange of deuterium and hydrogen between liquid and vapor phases by providing the maximum possible contact between liquid and vapor consistent with acceptable pressure and temperature changes in the vapor flow through the column. Since the concentration of deuterium takes place most readily at steam pressures and temperatures below two atmospheres absolute and 250° F.—preferably below 1 atmosphere absolute and 212° F.—it is desirable to place the fractionation column in that portion of the steam power cycle where steam pressures are of this order.

The individual pieces of equipment used to carry out this invention are standard in modern steam power plants and in recent distillation practice. However, some modifications will be necessary to adapt the process to an existing steam power plant, and a column packing is desirable which provides intimate contact of liquid and vapor while yielding a low pressure drop in the vapor passing through the column.

What we claim as our invention is:

1. A steam power plant comprising a boiler, at least one steam turbine arranged to be driven by steam from said boiler, a fractionation column having a high pressure end and a low pressure end, said high pressure end being connected to the main steam flow of the plant cycle to pass said main steam flow through said column, a condenser for condensing steam from said main steam flow which has passed through said column, means for returning the condensed steam from said condenser to the low pressure end of said column and through said column in the opposite direction to that of said main steam flow, means for drawing off as a supply of water enriched in deuterium some fluid derived from the high pressure end of said column, means for discharging to waste as water depleted in deuterium a predetermined quantity of fluid derived from fluid at the low pressure end of said column, and means for supplying to said column a predetermined amount of natural water.

2. A steam power plant as defined in claim 1 in which the means for drawing off water enriched in deuterium is connected to draw off water from the boiler.

3. A steam power plant as defined in claim 1 in which the means for discharging water depleted in deuterium is connected to discharge condensed steam being returned to the fractionation column.

4. A steam power plant as defined in claim 1 comprising a steam turbine having stages with the fractionation column connected to carry the main steam flow between two stages.

5. A steam power plant as defined in claim 1 in which the fractionation column is connected to carry the main steam flow from the steam turbine to the condenser.

References Cited in the file of this patent

UNITED STATES PATENTS

| | | |
|---|---|---|
| 1,499,697 | Ruths | July 1, 1924 |
| 2,218,342 | Pegram | Oct. 15, 1940 |